(12) United States Patent
Harvey et al.

(10) Patent No.: US 9,165,416 B2
(45) Date of Patent: Oct. 20, 2015

(54) DIGITAL OVER-THE-AIR KEYING SYSTEM

(75) Inventors: John M. Harvey, Carlsbad, CA (US); Michael David Atella, San Diego, CA (US); Thomas Francis Doyle, San Diego, CA (US); Loyie H. Sims, III, Valley Center, CA (US); Satish N. Ram, Poway, CA (US)

(73) Assignee: OMNITRACS, LLC, Dallas, TX (US)

( * ) Notice: Subject to any disclaimer, the term of this patent is extended or adjusted under 35 U.S.C. 154(b) by 1286 days.

(21) Appl. No.: 12/282,716

(22) PCT Filed: Mar. 14, 2007

(86) PCT No.: PCT/US2007/064013
§ 371 (c)(1),
(2), (4) Date: Dec. 1, 2008

(87) PCT Pub. No.: WO2007/106875
PCT Pub. Date: Sep. 20, 2007

(65) Prior Publication Data
US 2009/0219135 A1    Sep. 3, 2009

Related U.S. Application Data

(60) Provisional application No. 60/782,820, filed on Mar. 15, 2006.

(51) Int. Cl.
*G08B 29/00* (2006.01)
*G07C 9/00* (2006.01)
*B60R 25/20* (2013.01)
*B60R 25/24* (2013.01)
(Continued)

(52) U.S. Cl.
CPC ........ *G07C 9/00158* (2013.01); *B60R 25/2018* (2013.01); *B60R 25/241* (2013.01); *B60R 25/252* (2013.01); *B60R 25/255* (2013.01); *B60R 25/257* (2013.01); *G08G 1/205* (2013.01)

(58) Field of Classification Search
USPC ........................................................ 340/5.82
See application file for complete search history.

(56) References Cited

U.S. PATENT DOCUMENTS 5,715,905 A * 2/1998 Kaman .......................... 180/287
5,964,122 A * 10/1999 Bonnard et al. ............ 74/473.12
(Continued)

FOREIGN PATENT DOCUMENTS

CA    2428623    11/2004
EP    1128335    8/2001
(Continued)

OTHER PUBLICATIONS

Spinellis, Positions-Annotated Photographs: A Geotemporal Web, Apr.-Jun. 2003, IEEE Pervasive Computing.*
(Continued)

*Primary Examiner* — Brian Zimmerman
*Assistant Examiner* — Cal Eustaquio
(74) *Attorney, Agent, or Firm* — Arent Fox LLP (57) ABSTRACT

A system for providing operational access to equipment or vehicles is disclosed wherein digital access codes are assigned and transported over-the-air governing a vehicle's or equipment's use. The access codes can be generated in connection with comparison of entered and stored biometric data and/or entered code from a keypad. Various security protocols can be used to ensure the secure dispatch and delivery of code information.

49 Claims, 6 Drawing Sheets

(51) Int. Cl.
*B60R 25/25* (2013.01)
*G08G 1/00* (2006.01)

(56) References Cited

U.S. PATENT DOCUMENTS

| | | | |
|---|---|---|---|
| 6,038,315 | A * | 3/2000 | Strait et al. .................... 713/183 |
| 2001/0035811 | A1 * | 11/2001 | Dewan .......................... 340/5.25 |
| 2001/0040504 | A1 * | 11/2001 | Gehlot ........................... 340/426 |
| 2002/0097142 | A1 * | 7/2002 | Janiak et al. ................. 340/5.53 |
| 2002/0186845 | A1 * | 12/2002 | Dutta et al. ................... 380/247 |
| 2003/0128099 | A1 * | 7/2003 | Cockerham .................... 340/5.7 |
| 2003/0233573 | A1 * | 12/2003 | Phinney ......................... 713/200 |
| 2004/0135670 | A1 * | 7/2004 | Guba ............................ 340/5.21 |
| 2004/0252025 | A1 * | 12/2004 | Silverbrook et al. ...... 340/568.5 |
| 2005/0110609 | A1 * | 5/2005 | Mosgrove et al. ........... 340/5.72 |
| 2005/0225427 | A1 * | 10/2005 | Bell et al. ....................... 340/5.2 |

FOREIGN PATENT DOCUMENTS

| | | | |
|---|---|---|---|
| FR | 2819958 | 7/2002 | |
| GB | 2421623 A * | 6/2006 | ............. B60R 25/00 |
| WO | 9923614 | 5/1999 | |
| WO | 0108941 | 2/2001 | |
| WO | 2005021340 | 3/2005 | |

OTHER PUBLICATIONS

International Search Report and Written Opinion—PCT/US2007/064013—ISA/EPO—Oct. 11, 2007.

* cited by examiner

DIGITAL OVER-THE-AIR KEYING SYSTEM

CROSS REFERENCES TO RELATED APPLICATION

The present application claims priority to International Patent Application No. PCT/US2007/064013, entitled Digital Over-The-Air Keying System, filed on Mar. 14, 2007 which claims priority to U.S. Provisional Application Serial No. 60/782,820, entitled "Digital Over-The-Air Keying System," filed Mar. 15, 2006, assigned to the assignee hereof and incorporated herein by reference.

BACKGROUND

Asset tracking is of paramount importance in a number of industries such as the trucking industry and the equipment leasing and rental industries. Knowing the location of equipment, trucks and shipped goods enables predictive planning of actual events and better management of drivers and assets. For instance, good communication between a vehicle (and/or its operator) and its dispatcher advantageously permits scheduling controls. Good communications systems also address concerns regarding equipment, vehicle and/or freight theft. Wireless communication systems are well known for transmitting information between fixed stations and one or more geographically dispersed mobile receivers carried in trucks or on a piece of equipment. For example, the Global Positioning System (GPS), a system of low earth orbiting satellites, has been used to determine a piece of equipment's or a vehicle's position. Further, satellite communication systems have also been used in the trucking industry for many years to provide messaging information between fleet-owned dispatch centers and their respective tractor-trailer vehicles. Such systems offer significant benefits to fleet owners because they allow almost instantaneous communications and real-time position information. An example of such a satellite communication system is disclosed in U.S. Pat. No. 4,979,170 entitled "Alternating Sequential Half Duplex Communication System and Method"; U.S. Pat. No. 4,928,274 entitled "Multiplexed Address Control in a TDM Communication System"; U.S. Pat. No. 5,017,926 entitled "Dual Satellite Navigation System"; and U.S. Pat. No. 6,124,810 entitled "Method and Apparatus for Automatic Event Detection in a Wireless Communication System," all of which have been assigned to the assignee of the present invention and all being incorporated herein by reference thereto.

In the satellite communication system described in the above-mentioned patents, fleet-owned dispatch centers communicate using land-based systems such as telephone or fiber-optic networks with a hub, otherwise known as a network management facility (NMF). The NMF acts as a central communication station through which all communications between vehicles and a dispatch center pass. The NMF includes a number of Network Management Centers (NMCs), each NMC being responsible for providing a communication path for the NMF to geographically dispersed vehicles and/or equipment in the communication system using a geo-stationary satellite. A geostationary satellite includes one or more transponders. Transponders relay up and down link signals, (providing amplification and frequency translation) between geographically-dispersed earth stations which may be fixed or in-motion. Each NMC is assigned with different up and down link frequencies in order to avoid interference involving other Mobile Communication Terminals (MCTs) that are operating on the same satellite but with a different NMC. In the satellite communication system of the above referenced patents, each NMC system is capable of handling the communication needs of approximately 30,000 vehicles. Each MCT in the communication system comprises; a transceiver, modulator/demodulator, a CPU and GPS receiver which allows for text message exchange between the driver and dispatcher and position determination of the vehicle.

Access to and security of machinery, vehicles and freight are of the utmost importance and such concerns have come under greater scrutiny as of late. Of particular concern is the theft of vehicles or equipment or the unauthorized use of vehicles or equipment, especially those vehicles carrying hazardous freight.

There is therefore a need to provide strict vehicle or equipment access control. A need also exists to employ wireless communication systems in a manner which enables access and/or verification or change of access to vehicles or equipment. Until now, no such system has offered such access control with the efficacy of the system to be described herein.

BRIEF DESCRIPTION OF THE DRAWINGS

Applicable reference numerals have been carried forward.

DETAILED DESCRIPTION

Figure 1:
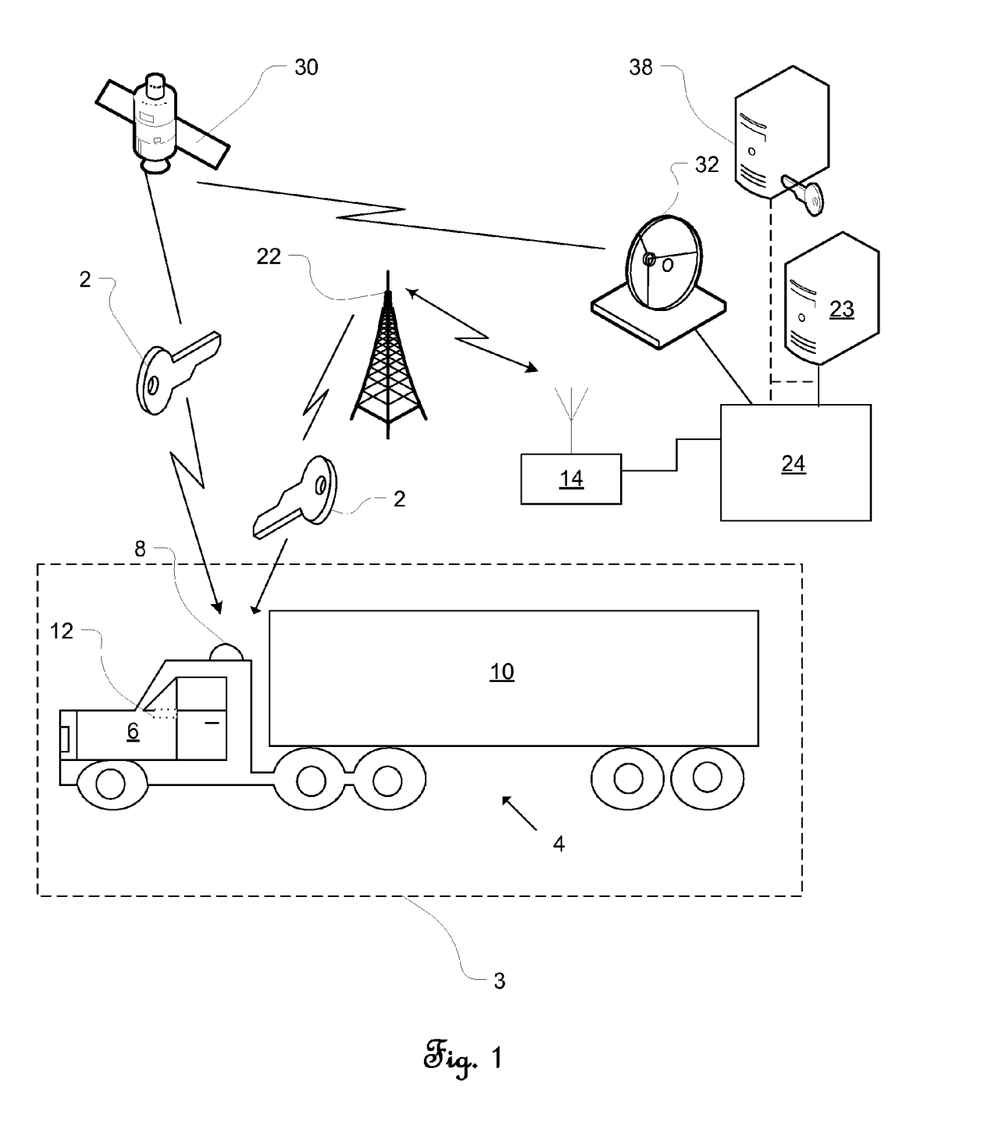
FIG. 1 illustrates a diagram of a wireless communications system deploying the digital keying system.

The foregoing discussed needs are addressed by a digital keying system deployed through a wireless communications system as shown in the diagram of FIG. 1. A digital key code, also referred herein and shown as digital access key 2, is assigned to an individual driver (not shown) of a vehicle or operator of a piece of equipment shown generally as box 3. For example, in one embodiment, box 3 may include vehicle 4 which is illustrated in FIG. 1 as a tractor trailer truck having cab 6 connected to trailer 10. Alternatively, digital keys can be assigned to a group of drivers or drivers that drive certain commodities or materials such as hazardous materials. The digital keys can provide for a granularity that a physical key cannot. Additionally, the key may be disabled to deny vehicle operational access in instances where a driver has been dismissed. Alternatively, the key may be set to allow vehicle operation by a driver only during certain times. Digital key codes are assigned over-the-air.

With reference to FIG. 1, a wireless transceiver, known as a Mobile Communications Terminal (MCT) 12, for communicating with a remote station such as NMF 14, is shown within cab 6. In one embodiment, antennas for MCT 12 can be located within radome 8. A radome is an enclosed housing, usually made of a low-loss dielectric material, that serves to protect antennas or sensors mounted on ground-based vehicles, ships, airplanes and the like without significantly altering the electrical performance of the enclosed antenna(s) or sensor(s). In one aspect of an embodiment, MCT 12 comprises an OnmiTRACS® satellite transceiver manufactured by QUALCOMM Incorporated of San Diego, Calif., for communicating wirelessly with satellite 30. However, MCT 12 may alternatively comprise a digital or analog cellular transceiver. In another embodiment, MCT 12 resides entirely onboard the vehicle 4. In other embodiments, MCT 12 uses a terrestrial wireless communication system to communicate with NMF 14, such as an analog or digital cellular telephone system (through base transceiver station (BTS) 22), or a wireless data communications network (such as a digital packet data network). Further communications can be carried out from NMF 14 using network 24 which may represent the Public Switched Telephone Network (PSTN) or a cable television network (CATV) through which wireless communications are carried out in conjunction with satellite 30 using satellite dish 32. Network 24 may also include the Internet. Digital key codes are transmitted to vehicle 4 (i.e., the associated communications device of vehicle 4) in connection with providing driver authorizations for use of the vehicle.

Figure 2:
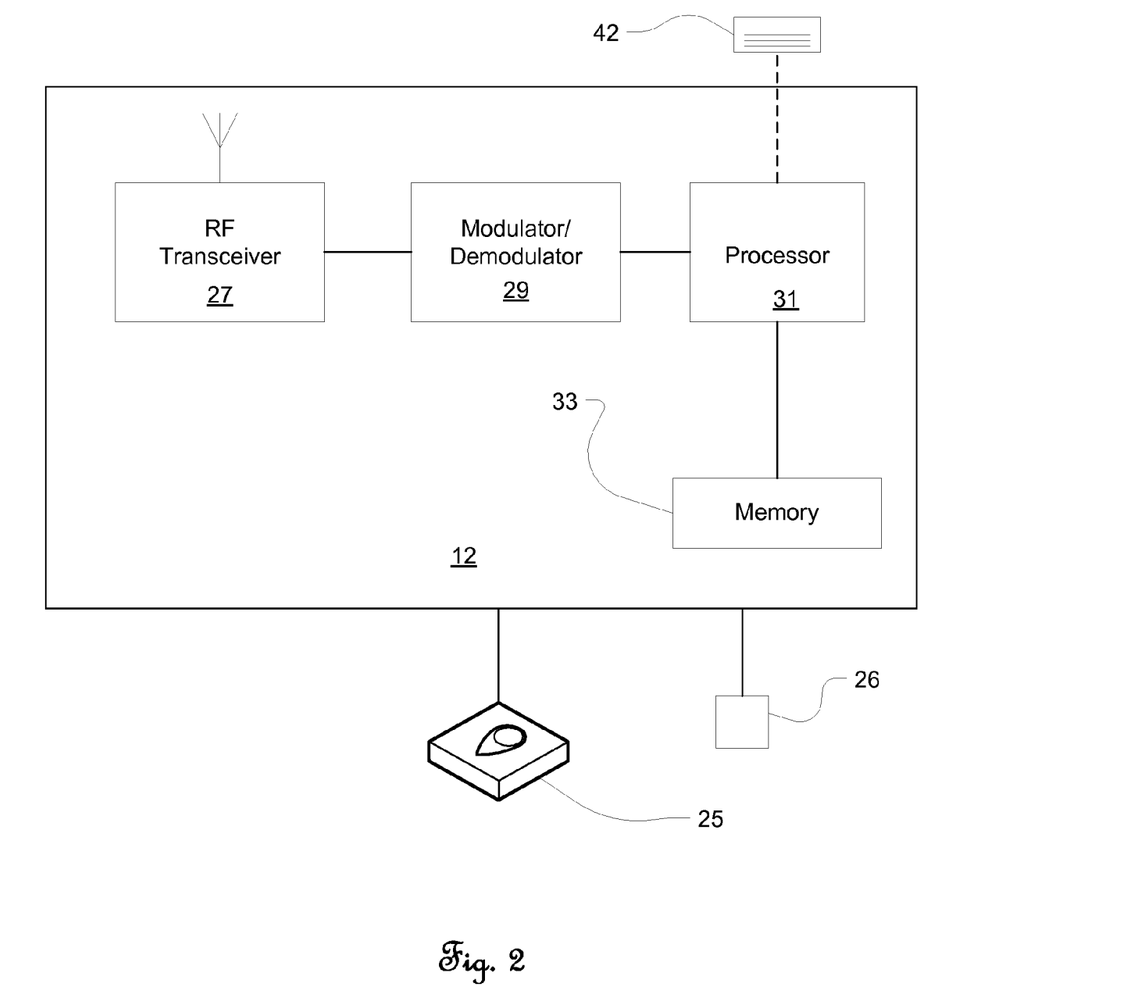
FIG. 2 illustrates a block diagram of MCT 12 connected to biometric reader 25 comprising a fingerprint reader, retinal scanner, voice analyzer, etc.

In some embodiments, a biometric reader may be used to verify the identity of a driver as a precondition to the transmission of a digital key code to vehicle 4. Thus, a biometric login is provided. FIG. 2 illustrates a block diagram of MCT 12 connected to biometric reader 25 comprising one or more of a fingerprint reader, retinal scanner, voice analyzer, etc. MCT 12 receives biometric data from biometric reader 25 and transmits it to a remote site such as NMF 14 which relays the data for verification to a site remote from vehicle 4, such as authorization server 23, using one of the foregoing described communication systems. At the remote site, the biometric data received is matched with a corresponding digital access key or code. In one aspect, a digital key code matched to the biometric data is transmitted to MCT 12. MCT 12 may also optionally contain or be attached or connected to keyboard 42 for inputting identification data. Alternatively, MCT 12 may include (or be attached to) badge reader 26 for reading a badge that includes identification information. Badge reader 26 may supplement or be used in place of biometric reader 25. Use of reader 26 is especially contemplated in instances where, on occasion, the biometric data or reader may not operate properly so that badge information may cause the digital key code to be transmitted to MCT 12.

With reference still to FIG. 2, MCT 12 comprises a radio frequency (RF) transceiver 27 for transmitting and receiving information including voice and data. The term transceiver as used herein is also contemplated to encompass a transmitter and a receiver, separate from one another, to carry out communications. High frequency communication signals are transmitter/received by RF transceiver 27, which are down-converted into baseband signals during reception and up-converted from baseband to high frequency signals during transmission. MCT 12 also comprises a modulator/demodulator 29 which provides an interface between processor 31 and RF transceiver 27, allowing information from processor 31 to be modulated in accordance with the particular wireless communications being used by MCT 12, and also to demodulate received information for use by processor 31. Modulator/demodulator 29 may also include a JAVA® virtual machine to provide platform portability between communication protocols at MCT 12 and a remote site. Processor 31 controls the various processes and functions of MCT 12. Further, processor 31 is programmed to interpret the digital key code information received from authorization server 23 to determine the access rights conveyed by the digital key code. Memory 33 is an electronic memory for storing various data including data and instructions for interpreting the digital code access as described herein.

In one aspect, the biometric logic may be used to recall certain bio-specific settings associated with a user such a position of controls, seat position and various other preferences noted in connection with the initial vehicle access by a user. This logic may be processed by processor 31 such that biometric settings are stored within memory 33 and made available in connection with the digital key code obtained from authorization server 23. In addition, reminders can be sent to user through the users' MCT or on the vehicle's communication terminal (e.g., radio) such as, "Please complete your timesheet."

In another aspect, biometric reader 25 may be incorporated into a vehicle's controls (steering wheel, hand grips, etc.) This would also allow for periodic verification (possibly without the operator's knowledge or interaction) that an authorized user is still operating the equipment or vehicle.

The foregoing system as shown in FIG. 1 is readily adaptable for use with any equipment. MCT 12 need only be associated with that equipment and operable to receive the digital access code. The digital access code in addition to causing access grant for vehicle or equipment use, can additionally define a number of parameters such as vehicle or equipment use and geographical boundaries or times. Consequently, the access code can circumscribe the place, time and extent of vehicle or equipment operation. One operator may have permission to drive a truck within a 30 mile radius of its current location, while another operator may have permission to operate a crane only between the hours of 8:00 a.m. and 4:00 p.m.

Access to a vehicle can easily be controlled by the digital over-the air keying system. For instance, should a driver be dismissed from his/her employ, the foregoing system easily permits denial of access to a vehicle by the dismissed driver. Further, rental equipment use can easily be controlled. For instance, upon expiration of a rental agreement, access to rental equipment may be denied. However, a digital access code may be updated "on-the fly"—something not readily possible with a physical key.

Therefore if rental equipment is being accessed after the expiration of a rental agreement or in violation of the agreement due to attempted use of equipment at a location on a second (unauthorized) job site, the renter can optionally renew, extend or amend the rental contract (and be billed accordingly) by agreeing to and "signing" an updated, new or extended contract digitally using a biometric login such as a fingerprint, or alternatively using an assigned password. Further, a variety of functions can be defined and controlled in combination with a controller operating in conjunction with the vehicle or equipment. For instance, in a rental situation, hourly rates can be altered depending on which vehicle is being used. Further, login time/hours may be integrated into a rental company's back office software for billing purposes.

In one aspect, should an attempted login occur using the same password or passcode entered (using for instance, biometric reader 25 or badge reader 26 of FIG. 2) at two separate job sites within a time period during which such attempts would be physically impossible by a single person, (e.g. attempts 10 minutes apart at two sites over 100 miles apart), access lockout may occur at both sites and an alert may be generated. However, in one preferred embodiment, a central issuing authority providing access to sites or equipment would not provide near simultaneous (or close in time) access to separate sites using the same key.

In another aspect, a digital key is issued from a dispatch center or other issuing authority with a "time to live." The "time to live" is a time period during which the digital key can provide access. Various permissions for the key may also be issued at the time of key issuance. For instance, these permissions may include where the rental equipment can be operated and what class of drives license the operator must have in order to operate certain equipment/vehicles. Additionally, should a vehicle or piece of equipment not be detected within a coverage area (site where equipment should be) for an extended period of time (with no communication possible to update the key), the authorization keys may be locked-out. Further, these permissions may be revoked and changed over-the air in near-real time.

A concept embodied herein enables issuance of a single key per person, while shifting to machines the task of remembering multiple keys as opposed to people having multiple keys, whether physical or by code, for each piece of equipment. Further, the digital access code or key conveyed to the equipment includes the information defining the access (e.g., the extent or degree of access) to the equipment.

Figure 3:
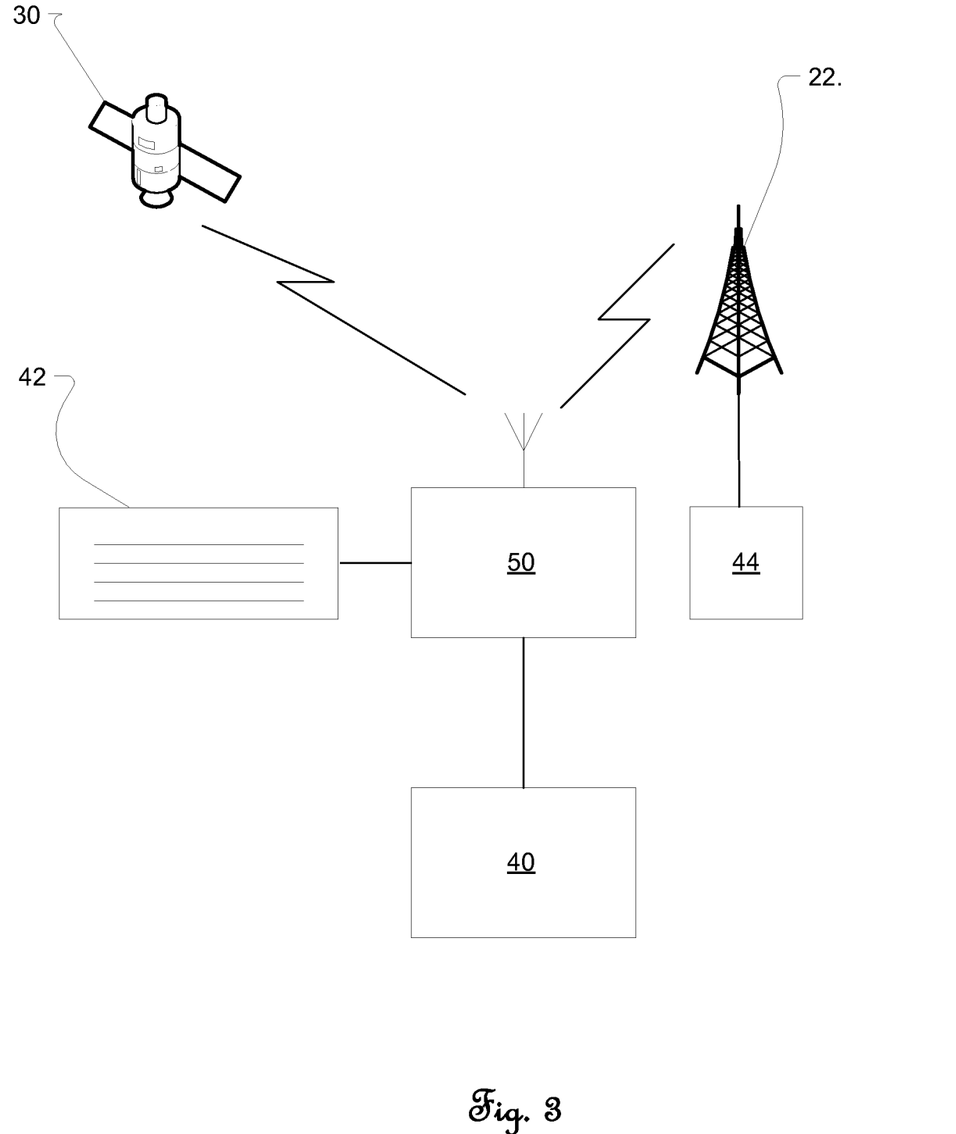
FIG. 3 illustrates a block diagram of an embodiment employing GT/Web.

In another embodiment, GT/Web can be used to assign/manage key codes to operators or groups of operators of equipment that can be sent wireless using GT to a piece of equipment or a group of equipment. GT/Web is service offered QUALCOMM® Incorporated that provides a Web interface for GlobalTRACS (GT) a system that provides wireless and satellite communications using a TCP/IP protocol over the Internet for mobile personnel using a single messaging system. FIG. 3 illustrates a block diagram of an embodiment employing GT/Web. GT wireless control unit 50 is substituted for and functions in a similar manner to MCT 12 of FIG. 1. For instance, at a large job site with multiple contractors, a code could be entered using keypad 42 attached to GT mobile communications unit 50. In addition or alternatively, biometric sensor 40 attached to unit 50 can be used to identify authorized operators.

Database 44 with which GT mobile communications unit 50 is in contact, is used to compare biometric sensor data with database data to determine a match within a specified tolerance. A program running on a remote server (not shown) can perform the comparison function. The server can return authorization for access to a vehicle or a piece of equipment through unit 50 using a relay driver (not shown). Alternatively, the comparison can be made locally. Stored data may be compared, in unit 50, with biometric or keyboard 42-entered data.

In other embodiments using GT/Web unique codes may be assigned to operators for entry by the operators on keypad 42 at the start of a work shift. This would allow contractors to use GT/Web to track/report/identify operator use of equipment, the length of time of each use and the amount of work achieved, thereby enabling productivity metrics to be developed for operators and equipment.

While key codes would enable the start of a piece of equipment, GT mobile communications unit could be used to reset the code remotely in the instance where operating time limits have been reached. Such expiration of time can result in the automatic shut down or slow down of a piece of equipment. Termination of use of equipment can occur in connection with operator termination, rental equipment contract expiration, rental equipment theft/vandalism, attempted operation of equipment past curfew hours, etc.

Figure 4:
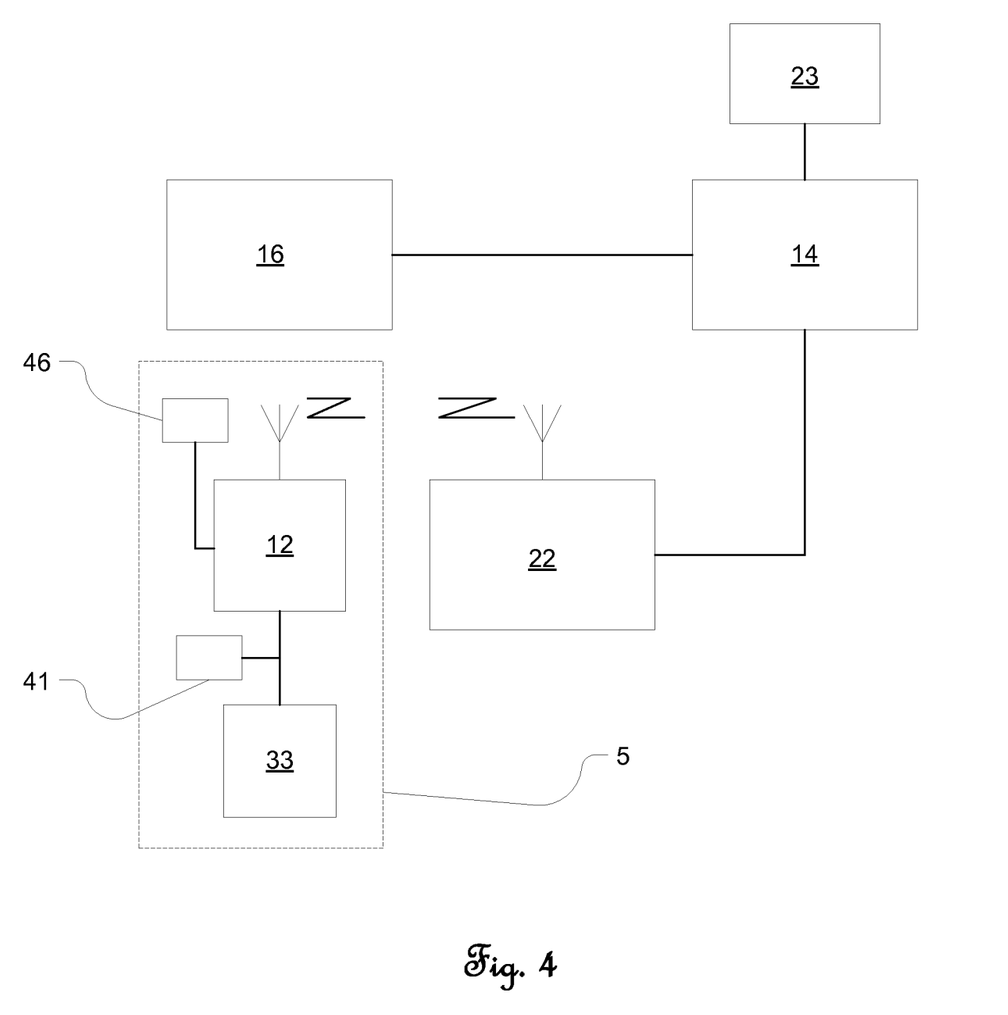
FIG. 4 illustrates a block diagram of a rental activity system.

In one embodiment, a system using digital over the air keying is shown which may, for instance, be used to implement a vehicle or equipment rental activity. With reference to FIG. 4, which illustrates a block diagram of a rental activity system, rental/leasing agency 16 causes the dispatch of a digital key code wireless through NMF 14 and BTS 22 to a piece of equipment or vehicle (hereafter designated equipment/vehicle 5) being rented or leased by having the key code sent to the MCT associated with (e.g. connected or coupled thereto) equipment/vehicle 5. MCT 12 sends the digital key code to controller 46 to which MCT 12 is coupled. The digital key code contains all of the access rights granted a particular user of equipment/vehicle 5 who need only input biometric data or a code at terminal 41 (e.g. a biometric scanner or a keyboard) connected to equipment/vehicle 5. A manifest of renters need not be maintained for archival purposes, since retention of such renters in memory is needed for only a short period of time relative a rental or lease period. In one aspect, biometric data (e.g. fingerprint, voice scan (voiceprint), retinal scan, etc.) may be taken at rental/leasing agency 16 from a renter/lessor. A scanner at the site of equipment/vehicle 5 reads the biometric data from the user and transmits, via MCT 12, this information back to authorization server 23 associated with rental/leasing agency 16. A proper match of the biometric data with access rights currently on file (e.g., in a memory storage (not shown) associated with authorization server 23), results in the authorization server 23 forwarding a digital key code through NMF 14 and BTS 22 to equipment/vehicle 5. Alternatively, input of a code, assigned by rental/leasing agency 16, at terminal 41 is transmitted via MCT 12 to authorization server 23. A proper match of the inputted code with access rights currently on file (e.g., in the memory storage associated with authorization server 23), results in the authorization server 23 forwarding a digital key code through NMF 14 to equipment/vehicle 5. In one embodiment, memory 33 connected to MCT 12 may hold the inputted code information or scanned biometric data for a brief period of time, e.g. equal to the length of the rental or lease period. Further, authorization information may be accessed in connection with inputting/scanning code or biometric data during use of equipment/vehicle 5. Processor 31 connected to (or alternatively) within MCT 12 compares the stored code or biometric data with the inputted/scanned code or biometric data entered during each equipment/vehicle use period (e.g. at startup or login). The transmitted digital code from authorization server 23 may also be maintained in memory 33. If the inputted/scanned code or biometric data matches the stored code or biometric data in memory, processor 31 permits use of equipment/vehicle 5 according to the access granted by the stored digital key code. This embodiment dispenses with a requirement to contact authorization server 23 every time a user logs in. However, for added security, the access allowed by the stored digital key code should be time limited, (e.g. no greater than some time period less than the rental/lease period).

Figure 5:
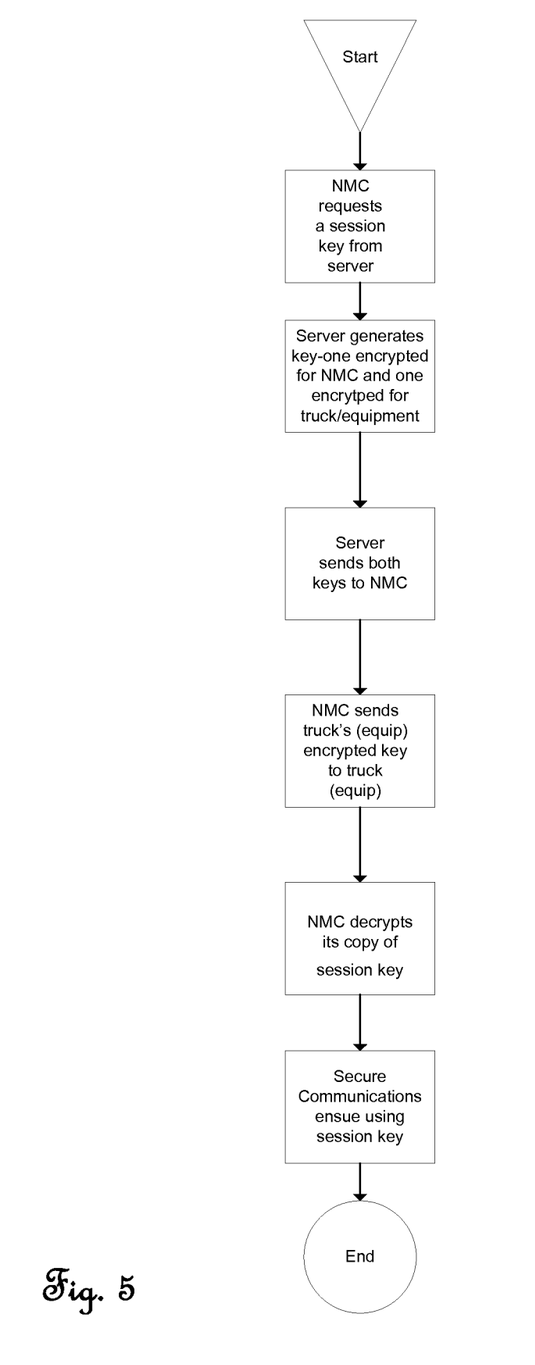
FIG. 5 illustrates a flowchart of a digital access key distribution protocol.

Since the digital key codes are being transmitted wirelessly for possible detection from a myriad of sources, well-known encryption protocols and encryption methods may be employed in connection with generating a digital access key. The communications system of FIG. 1 may be used to implement a digital access key distribution protocol in connection with public/private key server 38. In one embodiment using symmetric cryptography, assuming that a secret key is held by each NMF 14 and MCT 12, these keys are shared with server 38. NMF 14 or MCT 12 can request a session key from public/private key server 38 to communicate with one another. A session key is one aspect of key 2 in that it is a digital key valid only during a particular session of communication between NMF 14 and MCT 12. Server 38 generates a session key (which in one aspect is randomly generated) and encrypts the session key, using the secret key of NMF 14, as well as encrypts the same session key for MCT 12 using the secret key held by MCT 12. Server 38 sends the session key, encrypted according to the secret key of MCT 12, and it sends the same session key, encrypted according to the secret key of NMF 14, to the session key requester (either NMF 14 or MCT 12). The session key requester decrypts its assigned session key (encrypted with its secret key) and transmits the encrypted key of the entity it wishes to communicate with to that entity which in turn decrypts its session key using its assigned secret key. Thereafter, secure communications can ensue in the form of the dispatch of a digital access key 2, encrypted according to the session key, from NMF 14 to MCT 12. Digital access key 2 contains code which can be interpreted at the vehicle or equipment and it can be used to control or gain access to a particular vehicle, component, or system. FIG. 5 illustrates a flowchart of the foregoing described digital access key distribution protocol.

Other protocols are possible such as one based on the well-known interlock protocol often used to foil a man-in-the-middle cryptographic attack. At some point, digital code information may be transported over the Internet. Consequently, security protocols such as the Secure Sockets Layer (SSL) or its derivatives such as Transport Layer Security (TLS) can be employed. However, in the case where less security is contemplated, it is possible to send the digital key code wirelessly from an NMF without the necessity of encrypting the digital access code transmission.

Figure 6:
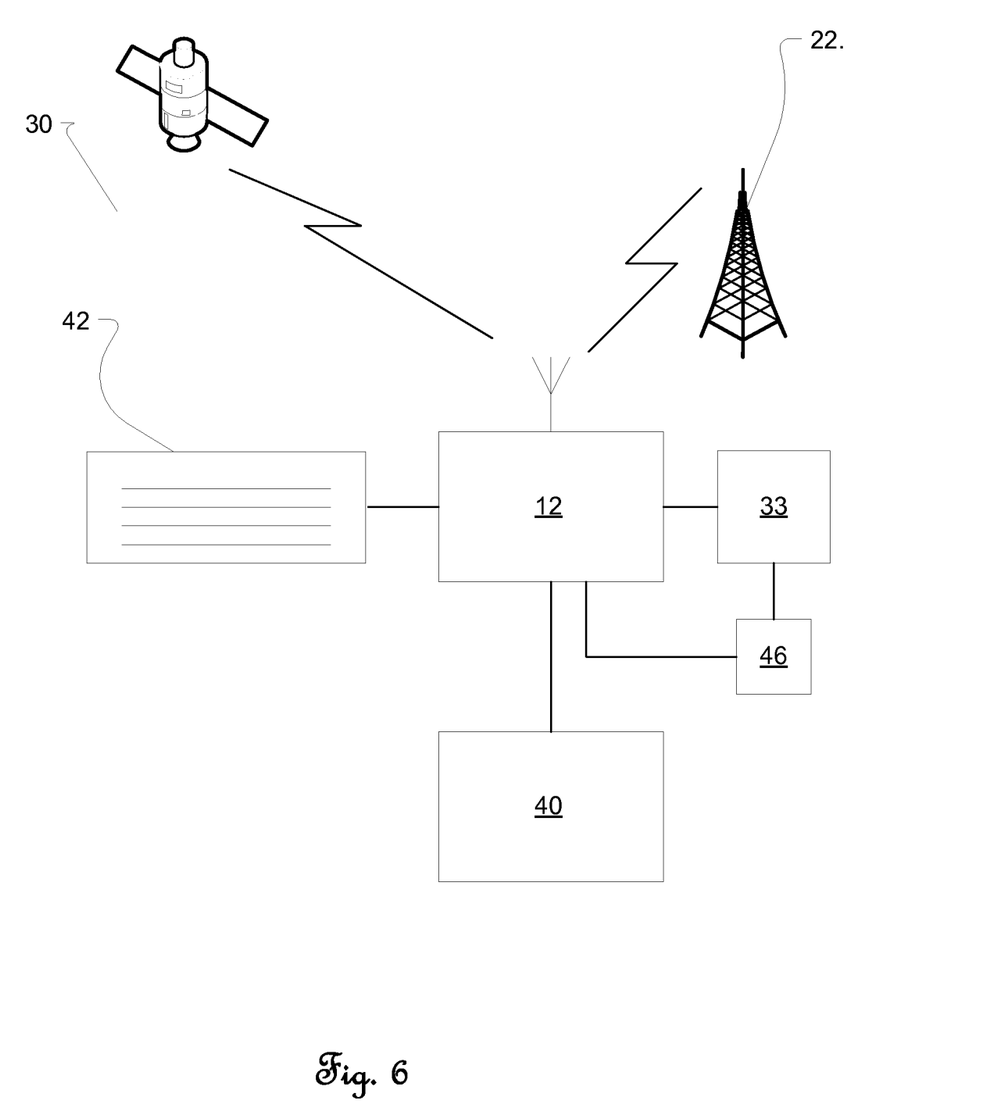
FIG. 6 illustrates is a block diagram of one implementation of tools used to carry out the protocol according to FIG. 5.

FIG. 6 illustrates a block diagram of one implementation of tools used to carry out the protocol described above and shown in the FIG. 5. Accordingly, these tools provide a method for placing secret and digital access keys in the possession of MCT 12 of FIG. 2. Biometric sensor 40 and keypad 42 are operatively connected to MCT 12. Biometric sensor 40 in one embodiment is a fingerprint reader. In another embodiment, biometric sensor 40 serves as a retinal scanner. In other embodiments, biometric sensor 40 can analyze voice patterns or determine identity through a fingerprint reader, retinal scanner or voice pattern analyzer in combination with a subject entering a code or password on keypad 42. Further, instead of a biometric login or password, a proximity sensor could be used to pick up access data stored on a security badge or helmet. Biometric data may be stored in memory 33, such as a flash memory, connected to MCT 12 or it may be remotely and wirelessly accessible by MCT 12 through NMF 14. It is also possible for memory 33 to be located within MCT 12. In one aspect, once it has been determined that the biometric data sensed by biometric sensor 40 is within a predefined threshold level, a corresponding secret key held within memory 33 is used in the manner described above and shown in FIG. 5 to determine a session key through which an encrypted digital access key code is received and interpreted by equipment controller 46 to govern control of the equipment or vehicle as specified according to user, group or classification of user, etc. For unauthorized/unrecognized logins to use a piece of equipment using a biometric login such as a fingerprint, the image of the unauthorized print may be stored or transmitted to the equipment owner and logged. A login system may be configured such that numerous unauthorized logins may trigger an alert. The number of unauthorized logins (as determined over a specified period of time if desired) may be configured by a customer (e.g., owner or lessor of equipment). Since biometric readers such as fingerprint scanners read minutia points on a finger and compare those points to a template using an algorithm for identification, nearest fit data may be stored in connection with logging unauthorized access attempts in an effort to identify offenders. In the case of a fired employee or an employee no longer authorized to use a piece of equipment, attempts to access equipment may be rendered ineffective and a record maintained of unauthorized attempts to access equipment. This is especially useful since often, while an employee may be terminated from employment, accounts, issued to a terminated employee providing equipment access, may not have been terminated.

In the foregoing embodiments, it should be noted that for further control, by an equipment or vehicle owner, etc., use authorizations can be limited in time. For instance, verification of the authorization can be set up to occur within, for instance, 6 hours of a previous authorization request, thereby requiring the operator of the equipment or vehicle to resubmit to the authorization procedure. For vehicles capable of operating with more than one user, such as tractor trailers, dual log-in verification may be achieved which would allow other functions (e.g., navigation text entry while driving, etc.). To prevent a second user from logging in and not accompanying the first driver, a second verification or multiple re-verifications may be required after a pre-determined number of miles or hours.

Although the invention herein has been described with reference to particular embodiments, it is to be understood that these embodiments are merely illustrative of the principles and applications of the present invention. For instance, the foregoing described digital keys may in fact embody the biometric data. For example, a digital key assigned to a person could embody that person's thumbprint characteristic. Additionally, the authorization of equipment may be linked to an employee's work schedule, a job site schedule, a geofence operation schedule involving an authorized job site, etc. Further, authorization may be based on safety considerations, e.g., whether an operator is trained or qualified to use a particular piece of equipment, etc. It is therefore to be understood that numerous modifications may be made to the illustrative embodiments and that other arrangements may be devised without departing from the spirit and scope of the present invention as defined by the appended claims.

The invention claimed is:

1. An apparatus for use in controlling equipment access, comprising:
   a sensor configured to detect first identification data associated with a first user and second identification data associated with a second user;
   a transmitter configured to transmit said first identification data and said second identification data to a remote location;
   a receiver configured to receive a digital access code from the remote location, wherein said digital access code is received in connection with a determination that said first identification data warrants an extent of access to said equipment by the first user, said digital access code defining a first set of functions that are provided for use by the first user and a period of time after which the first user that is authorized access to said equipment is to reengage the sensor for re-verification of authorization during operation of the equipment;
   wherein the determination that the first identification data warrants an extent of access to the equipment by the first user is based on whether the second identification data warrants the extent of access to the equipment by the second user;
   wherein if the second identification data transmitted to the remote location warrants the extent of access to the equipment by the second user, said digital access code defining a second set of functions that are different from the first set of functions and that are provided for concurrent use with the first set of functions by both the first user and the second user while the second user is accompanying the first user during operation of the equipment; and wherein both the first user and the second user are prompted for re-verification of authorization during operation of the equipment to ensure that the second user is accompanying the first user and to maintain availability of the second set of functions to both the first user and the second user.

2. The apparatus of claim 1, wherein said digital access code specifies the length of time of access during which said equipment is operated.

3. The apparatus of claim 1, wherein said equipment includes a vehicle.

4. The apparatus of claim 1, wherein said identification sensor consists of a fingerprint reader, a retinal scanner, a voice scanner, a proximity badge reader or a combination thereof.

5. The apparatus of claim 1, further comprising a device configured to receive a pass code, said pass code being used in connection with said first identification data to determine access to said equipment.

6. The apparatus of claim 1, further comprising:
a memory configured to store the first identification data coupled to said receiver; and
a comparator configured to compare said first identification data stored on the memory with the first identification data detected by said identification sensor.

7. An apparatus for use in controlling equipment access, comprising:
a receiver configured to receive from a remote equipment first identification data associated with a first user and second identification data associated with a second user;
an authenticator configured to authenticate the first identification data and the second identification data received from said equipment;
a transmitter configured to transmit a digital access code in connection with a determination that the first identification data warrants an extent of access to the equipment by the first user, said digital access code defining a first set of functions that are provided for use by the first user and a period of time after which the first user that is authorized access to said equipment is to reengage a sensor at the equipment for re-verification of authorization during operation of the equipment;
wherein the determination that the identification data warrants an extent of access to the equipment by the first user is based on whether the second identification data warrants the extent of access to the equipment by the second user; and
wherein if the second identification data received from the remote equipment warrants the extent of access to the equipment by the second user, said digital access code defining a second set of functions that are different from the first set of functions and that are provided for concurrent use with the first set of functions by both the first user and the second user while the second user is accompanying the first user during operation of the equipment; and
wherein both the first user and the second user are prompted for re-verification of authorization during operation of the equipment to ensure that the second user is accompanying the first user and to maintain availability of the second set of functions to both the first user and the second user.

8. The apparatus of claim 7, wherein said digital access code is transmitted over-the-air according to a protocol consisting of TCP/IC, SSL, TLS, a protocol employing symmetric cryptography, an interlock protocol or a combination thereof.

9. The apparatus of claim 7, wherein said digital access code specifies the duration of time during which said equipment can be operated.

10. The apparatus of claim 7, wherein said digital access code specifies the geographic area of operation of the equipment.

11. The apparatus of claim 7, wherein said digital access code specifies which group of individuals can operate said equipment.

12. A method for controlling equipment access comprising:
receiving from a remote equipment first identification data associated with a first user and second identification data associated with a second user;
authenticating the first identification data and the second identification data received from the equipment;
transmitting a digital access code in connection with a determination that the first identification data warrants an extent of access to the equipment by the first user, said digital access code defining a first set of functions that are provided for use by the first user and a period of time after which the first user that is authorized access to said equipment is to reengage a sensor at the equipment for re-verification of authorization during operation of the equipment;
wherein the determination that the first identification data warrants an extent of access to the equipment by the first user is based on whether the second identification data warrants the extent of access to the equipment by the second user; and
wherein if the second identification data received from the remote equipment warrants the extent of access to the equipment by the second user, said digital access code defining a second set of that are different from the first set of functions and that are provided for concurrent use with the first set of functions by both the first user and the second user while the second user is accompanying the first user during operation of the equipment; and
wherein both the first user and the second user are prompted for re-verification of authorization during operation of the equipment to ensure that the second user is accompanying the first user and to maintain availability of the second set of functions to both the first user and the second user.

13. The method of claim 12, wherein said first identification data is biometric data.

14. The method of claim 12, wherein said digital access code is transmitted in connection with a protocol consisting of TCP/IC, SSL, TLS, a protocol employing symmetric cryptography, an interlock protocol or a combination thereof.

15. The method of claim 12, wherein said digital access code specifies the duration of time during which said equipment can be operated.

16. The method of claim 12, wherein said digital access code specifies the geographic area of operation of the equipment.

17. The method of claim 12, wherein said digital access code specifies which group of individuals can operate said equipment.

18. The method of claim 12, wherein a single digital access code is assigned to the first user and wherein said digital access code is configured to define access by said first user to a plurality of equipments.

19. The method of claim 18, wherein said first user comprises of an individual person or a group of people.

20. The method of claim 12, wherein said digital access code includes said biometric data.

21. The method of claim 12, wherein said extent of equipment access is time limited.

22. The method of claim 12, wherein the extent of equipment access is capable of being changed in connection with changing the digital access code.

23. The method of claim 12, wherein an alert is issued in response to said first identification data being unverifiable in connection with receiving a number of requests for access to the equipment.

24. The method of claim 23, wherein use of said equipment is locked out in connection with the issuance of said alert.

25. A method for controlling equipment access, comprising:
- detecting first identification data associated with a first user and second identification data associated with a second user;
- transmitting said first identification data and said second identification data to a remote location;
- receiving a digital access code from the remote location, wherein said digital access code is received in connection with a determination that said first identification data warrants an extent of access to said equipment by the first user, said digital access code defining a first set of functions that are provided for use by the first user and a period of time after which the first user that is authorized access to said equipment is to reengage a sensor for re-verification of authorization during operation of the equipment;
- wherein the determination that the first identification data warrants an extent of access to the equipment by the first user is based on whether the second identification data warrants the extent of access to the equipment by the second user; and
- wherein if the second identification data transmitted to the remote location warrants the extent of access to the equipment by the second user, said digital access code defining a second set of functions that are different from the first set of functions and that are provided for concurrent use with the first set of functions by both the first user and the second user while the second user is accompanying the first user during operation of the equipment; and
- wherein both the first user and the second user are prompted for re-verification of authorization during operation of the equipment to ensure that the second user is accompanying the first user and to maintain availability of the second set of functions to both the first user and the second user.

26. The method of claim 25, wherein said digital access code specifies the length of time of access during which said equipment is operated.

27. The method of claim 25, wherein said equipment includes a vehicle.

28. The method of claim 25, wherein said identification sensor consists of a fingerprint reader, a retinal scanner, a voice scanner, a proximity badge reader or a combination thereof.

29. The method of claim 25, further comprising receiving a pass code, said pass code being used in connection with said first identification data to determine access to said equipment.

30. The method of claim 25, further comprising:
- storing the first identification data coupled to said receiver; and
- comparing said first identification data stored on the memory with the first identification data detected by said identification sensor.

31. An apparatus for use in controlling equipment access comprising:
- means for receiving from a remote equipment first identification data associated with a first user and second identification data associated with a second user;
- means for authenticating the first identification data and the second identification data received from said equipment;
- means for transmitting a digital access code in connection with a determination that the first identification data warrants an extent of access to the equipment by the first user, said digital access code defining a first set of functions that are provided for use by the first user and a period of time after which the first user that is authorized access to said equipment is to reengage a sensor at the equipment for re-verification of authorization during operation of the equipment;
- wherein the determination that the first identification data warrants an extent of access to the equipment by the first user is based on whether the second identification data warrants the extent of access to the equipment by the second user; and
- wherein if the second identification data received from the remote equipment warrants the extent of access to the equipment by the second user, said digital access code defining a second set of functions that are different from the first set of functions and that are provided for concurrent use with the first set of functions by both the first user and the second user while the second user is accompanying the first user during operation of the equipment; and
- wherein both the first user and the second user are prompted for re-verification of authorization during operation of the equipment to ensure that the second user is accompanying the first user and to maintain availability of the second set of functions to both the first user and the second user.

32. The apparatus of claim 31, wherein said digital access code is transmitted over-the-air according to a protocol consisting of TCP/IC, SSL, TLS, a protocol employing symmetric cryptography, an interlock protocol or a combination thereof.

33. The apparatus of claim 31, wherein said digital access code specifies the duration of time during which said equipment can be operated.

34. The apparatus of claim 31, wherein said digital access code specifies the geographic area of operation of the equipment.

35. The apparatus of claim 31, wherein said digital access code specifies which group of individuals can operate said equipment.

36. An apparatus for use in controlling equipment access comprising:
- means for detecting first identification data associated with a first user and second identification data associated with a second user;
- means for transmitting said first identification data and said second identification data to a remote location;
- means for receiving a digital access code from the remote location, wherein said digital access code is received in connection with a determination that said first identification data warrants an extent of access to said equipment by the first user, said digital access code defining a first set of functions that are provided for use by the first user and a period of time after which the first user that is authorized access to said equipment is to reengage a sensor for re-verification of authorization during operation of the equipment;

wherein the determination that the first identification data warrants an extent of access to the equipment by the first user is based on whether the second identification data warrants the extent of access to the equipment by the second user; and wherein if the second identification data transmitted to the remote location warrants the extent of access to the equipment by the second user, said digital access code defining a second set of functions that are different from the first set of functions and that are provided for concurrent use with the first set of functions by both the first user and the second user while the second user is accompanying the first user during operation of the equipment; and wherein both the first user and the second user are prompted for re-verification of authorization during operation of the equipment to ensure that the second user is accompanying the first user and to maintain availability of the second set of functions to both the first user and the second user.

37. The apparatus of claim 36, wherein said digital access code specifies the length of time of access during which said equipment is operated.

38. The apparatus of claim 36, wherein said equipment includes a vehicle.

39. The apparatus of claim 36, wherein said identification sensor consists of a fingerprint reader, a retinal scanner, a voice scanner, a proximity badge reader or a combination thereof.

40. The apparatus of claim 36, further comprising means for receiving a pass code, said pass code being used in connection with said first identification data to determine access to said equipment.

41. The apparatus of claim 36, further comprising:
means for storing the first identification data coupled to said receiver; and
means for comparing said first identification data stored on the memory with the first identification data detected by said identification sensor.

42. The apparatus of claim 1, wherein the determination that the first identification data warrants an extent of access to the equipment by the first user is based on whether the first user is qualified to use the equipment.

43. The apparatus of claim 7, wherein the determination that the first identification data warrants an extent of access to the equipment by the first user is based on whether the first user is qualified to use the equipment.

44. The method of claim 12, wherein the determination that the first identification data warrants an extent of access to the equipment by the first user is based on whether the first user is qualified to use the equipment.

45. The method of claim 25, wherein the determination that the first identification data warrants an extent of access to the equipment by the first user is based on whether the first user is qualified to use the equipment.

46. The apparatus of claim 31, wherein the determination that the first identification data warrants an extent of access to the equipment by the first user is based on whether the first user is qualified to use the equipment.

47. The apparatus of claim 36, wherein the determination that the first identification data warrants an extent of access to the equipment by the first user is based on whether the first user is qualified to use the equipment.

48. The apparatus of claim 1, wherein the first set of functions comprises vehicle operation, and the second set of functions comprises navigation text entry while driving.

49. The apparatus of claim 7, wherein the first set of functions comprises vehicle operation, and the second set of functions comprises navigation text entry while driving.

* * * * *